(12) United States Patent
Ranganath et al.

(10) Patent No.: US 10,510,080 B2
(45) Date of Patent: Dec. 17, 2019

(54) MOBILE FRAUD PREVENTION SYSTEM AND METHOD

(71) Applicant: JPMorgan Chase Bank, N.A., New York, NY (US)

(72) Inventors: Satyan Ranganath, Landenberg, PA (US); Stan Szwalbenest, Newtown, PA (US); Maura Rose, Brooklyn, NY (US); Marcia Keld, Middletown, DE (US); Manning Field, Media, PA (US); Ryan McInerney, Rye, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 156 days.

(21) Appl. No.: 15/691,795

(22) Filed: Aug. 31, 2017

(65) Prior Publication Data

US 2017/0364919 A1    Dec. 21, 2017

Related U.S. Application Data

(63) Continuation of application No. 13/681,745, filed on Nov. 20, 2012, now Pat. No. 9,779,403, which is a
(Continued)

(51) Int. Cl.
*G06Q 20/40* (2012.01)
*G06Q 20/20* (2012.01)

(52) U.S. Cl.
CPC ......... *G06Q 20/4016* (2013.01); *G06Q 20/20* (2013.01); *G06Q 20/405* (2013.01)

(58) Field of Classification Search
CPC .. G06Q 20/00–04; G06Q 30/00; G06Q 40/00; G06Q 10/00; G06K 9/20;
(Continued)

(56) References Cited

U.S. PATENT DOCUMENTS 5,991,617 A    11/1999    Powell
6,212,266 B1    4/2001    Busuioc
(Continued)

FOREIGN PATENT DOCUMENTS

| EP | 1209935 | 10/2005 |
|---|---|---|
| WO | WO2002043424 | 5/2002 |
| WO | WO2003094562 | 11/2003 |

*Primary Examiner* — Olusegun Goyea
(74) *Attorney, Agent, or Firm* — Greenblum & Bernstein, P.L.C.

(57) ABSTRACT

A fraud prevention system is disclosed for preventing fraudulent activity on user accounts, the fraud prevention system interacting with a transaction tracking system for allowing association of transactions with user-defined categories. The fraud prevention system may include a computer memory including at least one database storing system settings specifying account-related events that require fraud prevention action and user-defined settings specifying account-related events that require fraud prevention action, wherein at least one of the user-defined settings pertains to events falling in one of the user-defined categories. The fraud prevention system may also include at least one computer processor programmed for detecting occurrence of the account-related events, accessing the system settings and user settings in the computer memory to determine if a fraud prevention action is required in response to the detected account-related event, activating a fraud prevention user interface for the user when fraud prevention action is required, and receiving user instructions through the fraud prevention interface and processing the user instructions.

18 Claims, 15 Drawing Sheets

Related U.S. Application Data continuation-in-part of application No. 12/388,730, filed on Feb. 19, 2009, now Pat. No. 9,773,247, which is a continuation-in-part of application No. 11/952,457, filed on Dec. 7, 2007, now Pat. No. 7,949,579.

(58) Field of Classification Search
CPC ........... G06K 9/62; G06F 21/00; G06F 3/033; G06F 21/216
USPC .............. 705/26.1, 26.35, 30–40, 26.61, 44; 235/375–385
See application file for complete search history.

(56) References Cited

U.S. PATENT DOCUMENTS

| | | | | |
|---|---|---|---|---|
| 6,859,212 B2* | 2/2005 | Kumar | G06F 9/547 | 715/744 |
| 7,394,346 B2* | 7/2008 | Bodin | G06F 3/017 | 340/10.1 |
| 7,729,686 B2 | 6/2010 | Corson et al. | | |
| 7,848,737 B2 | 12/2010 | Robles et al. | | |
| 7,990,365 B2* | 8/2011 | Marvit | G06F 3/017 | 345/156 |
| 8,001,080 B2* | 8/2011 | Gupta | G06F 16/27 | 707/617 |
| 8,019,685 B2* | 9/2011 | Patterson | G06Q 20/04 | 705/16 |
| 8,103,588 B2* | 1/2012 | Patterson | G06Q 20/04 | 705/16 |
| 8,205,790 B2* | 6/2012 | Pennella | G06F 21/31 | 235/375 |
| 8,666,841 B1* | 3/2014 | Claridge | G06Q 20/4016 | 705/26.35 |
| 2003/0132974 A1* | 7/2003 | Bodin | G06F 3/017 | 715/863 |
| 2003/0144952 A1* | 7/2003 | Brown | G06Q 20/04 | 705/40 |
| 2004/0015403 A1* | 1/2004 | Moskowitz | G06Q 30/06 | 705/26.61 |
| 2004/0054592 A1* | 3/2004 | Hernblad | G06Q 20/32 | 705/15 |
| 2004/0059950 A1* | 3/2004 | Bender | G06F 21/316 | 726/5 |
| 2005/0097037 A1* | 5/2005 | Tibor | G06K 9/00006 | 705/39 |
| 2005/0212756 A1 | 9/2005 | Marvit et al. | | |
| 2006/0089909 A1* | 4/2006 | McLeod | G06Q 20/04 | 705/44 |
| 2006/0282660 A1* | 12/2006 | Varghese | G06Q 20/341 | 713/155 |
| 2007/0000999 A1* | 1/2007 | Kubo | G06Q 20/40 | 235/380 |
| 2007/0084913 A1* | 4/2007 | Weston | G06Q 20/20 | 235/380 |
| 2007/0100773 A1* | 5/2007 | Wallach | G06Q 20/382 | 705/75 |
| 2007/0239606 A1* | 10/2007 | Eisen | G06Q 20/3674 | 705/51 |
| 2007/0244782 A1* | 10/2007 | Chimento | G06Q 20/00 | 705/35 |
| 2008/0009267 A1 | 1/2008 | Robles et al. | | |
| 2008/0040692 A1* | 2/2008 | Sunday | G06F 3/04883 | 715/863 |
| 2008/0052164 A1* | 2/2008 | Abifaker | G06Q 20/10 | 705/14.27 |
| 2008/0156866 A1* | 7/2008 | McNeal | G06K 9/00006 | 235/379 |
| 2008/0170776 A1* | 7/2008 | Albertson | G06F 21/35 | 382/154 |
| 2008/0195506 A1* | 8/2008 | Koretz | G06Q 30/0601 | 705/26.1 |
| 2008/0222002 A1* | 9/2008 | Hu | G06Q 20/382 | 705/38 |
| 2008/0275779 A1* | 11/2008 | Lakshminarayanan | G06Q 20/02 | 705/39 |
| 2008/0277465 A1* | 11/2008 | Pletz | G06Q 20/24 | 235/379 |
| 2008/0281733 A1* | 11/2008 | Kubo | G06Q 20/40 | 705/30 |
| 2008/0288405 A1* | 11/2008 | John | G06Q 20/40 | 705/44 |
| 2008/0319889 A1* | 12/2008 | Hammad | G06Q 20/04 | 705/35 |
| 2009/0002333 A1* | 1/2009 | Maxwell | G06F 3/04883 | 345/173 |
| 2009/0012898 A1* | 1/2009 | Sharma | G06Q 20/24 | 705/44 |
| 2009/0081989 A1* | 3/2009 | Wuhrer | G06Q 20/10 | 455/406 |
| 2009/0096610 A1* | 4/2009 | Thorn | G06F 3/017 | 340/572.4 |
| 2009/0106151 A1 | 4/2009 | Carpenter et al. | | |
| 2009/0108063 A1* | 4/2009 | Jain | G06K 7/10237 | 235/380 |
| 2009/0127329 A1* | 5/2009 | Barret | G06Q 20/02 | 235/380 |
| 2009/0128335 A1* | 5/2009 | Leung | G06Q 30/02 | 340/572.1 |
| 2009/0164269 A1 | 6/2009 | Bennett | | |
| 2009/0171830 A1* | 7/2009 | Blythe | G06Q 20/105 | 705/37 |
| 2009/0234760 A1* | 9/2009 | Walter | G06Q 20/40 | 705/30 |
| 2009/0281937 A1* | 11/2009 | Gupta | G06Q 20/20 | 705/35 |
| 2009/0327134 A1* | 12/2009 | Carlson | G06Q 20/04 | 705/44 |
| 2010/0130172 A1 | 5/2010 | Vendrow et al. | | |
| 2011/0276489 A1 | 11/2011 | Larkin | | |
| 2012/0047072 A1 | 2/2012 | Larkin | | |
| 2012/0101882 A1 | 4/2012 | Todd | | |
| 2012/0246076 A1 | 9/2012 | Kobayashi | | |
| 2012/0265677 A1 | 10/2012 | Rackley, III et al. | | |
| 2013/0080368 A1 | 3/2013 | Nandy | | |
| 2013/0191789 A1* | 7/2013 | Calman | G06F 3/017 | 715/863 |
| 2013/0262312 A1* | 10/2013 | Carlson | G06Q 20/04 | 705/44 |

\* cited by examiner

| Amount | Point of sale — 710 | Location — 720 | Categories — 730 | Merchant — 740 |
|---|---|---|---|---|
| ≥ $500 — 702 | Any | Any | Any | Any |
| ≥ $50 | Keyed | In-state | Auto | Any |
| ≥ $75 | Online | Out-of-state | Beauty | eBay |
| ≥ $100 | Retail | International | Clothing | PayPal |
| ≥ $150 | | | Education | |
| ≥ $200 | | | Electronics | |
| ≥ $250 | | | Entertainment | |
| ≥ $300 | | | Fees | |
| ≥ $400 | | | Finance | |
| ≥ $500 | | | Food + Dining | |

Create rule — 760

700

Never allow ▶

Amount   ≥ $500
POS      Any
Location Out-of-state
Category Any
Merchant Any

Tell us about yourself: 1200

Do you own a smart phone   Yes   No   1204
Answering yes will generate in a SMS message to your Cell Phone with a link to download JOT Authorizing Officer must be one of the following:

First Name / M.I.:* First Name*   MI        Last Name:* Last Name*
SSN:*                                        Date of Birth:*
Residential Street Address:*                 ZIP Code:*
City:*                                       State:* State
Home Phone Number:*                          Cell Phone Number:*   1202
Mother's Maiden Name:*                       Email Address:*
Gross Annual Income:† $        .00

† Alimony, child support, or separate maintenance need not be revealed if you do not wish to rely on it.

FIG 12

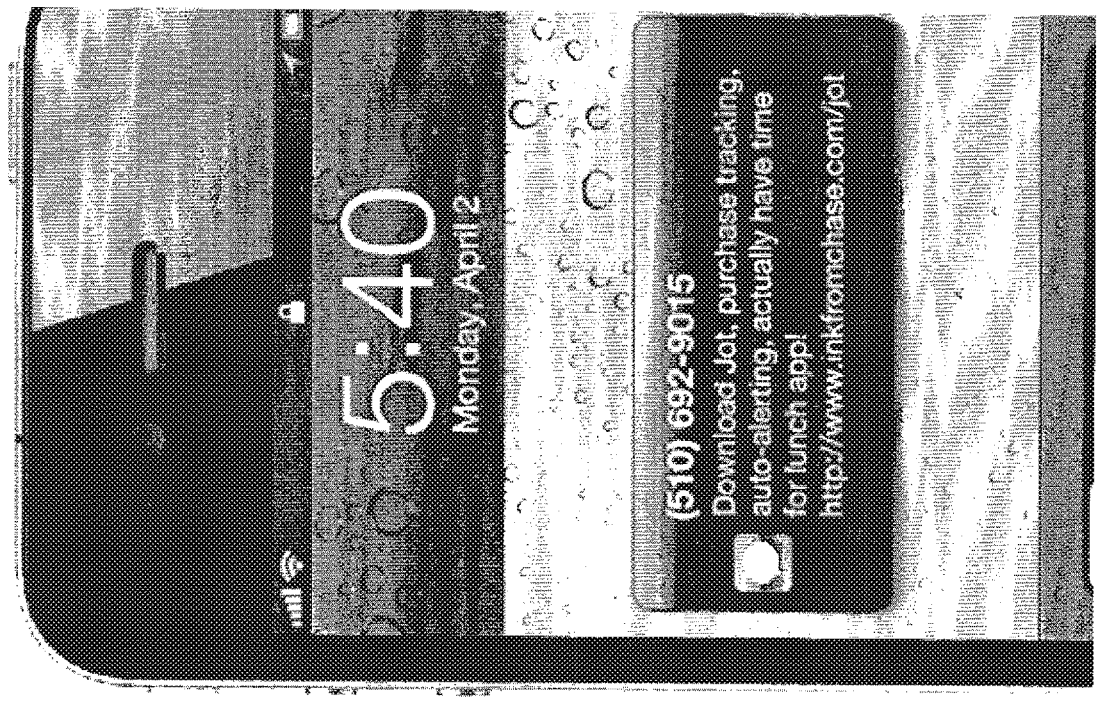
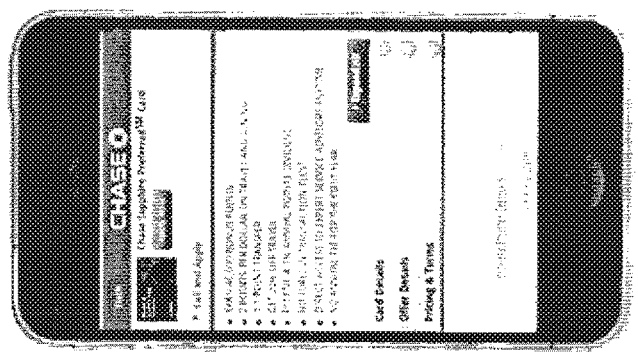
FIG 13

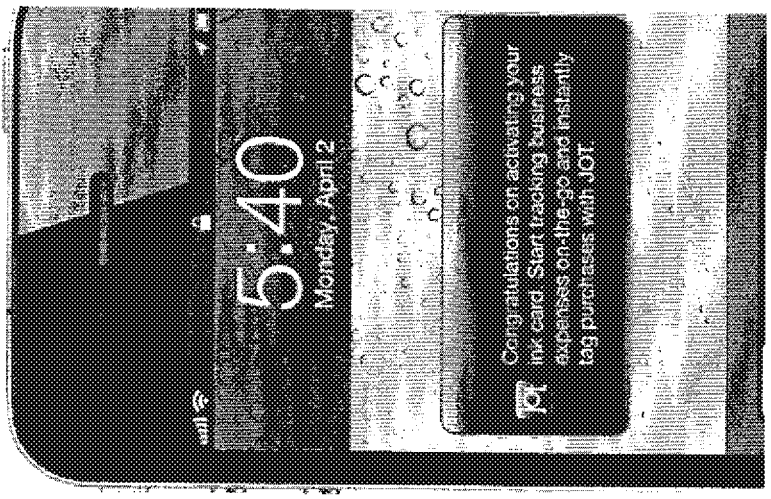
Upon activation card member Receives a push notification
1420
Card member calls to activate card
1410
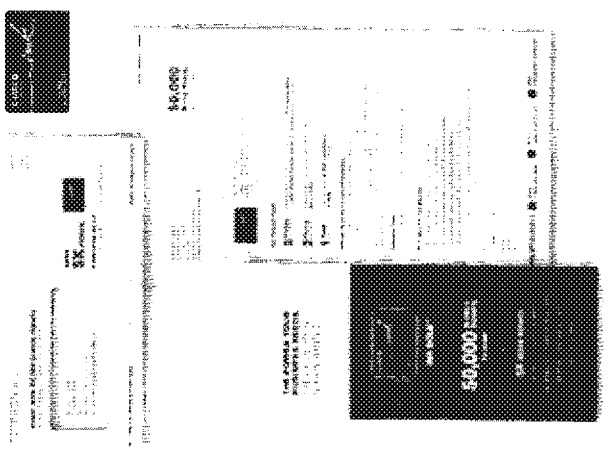
Welcome kit after approval received by Card member
1400
FIG 14

Account Owner issues an employee card
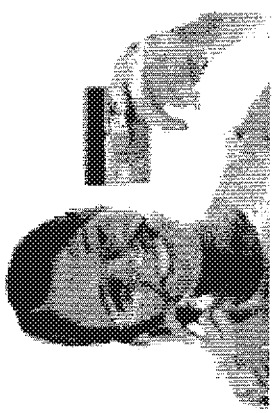
Employee calls to activate card
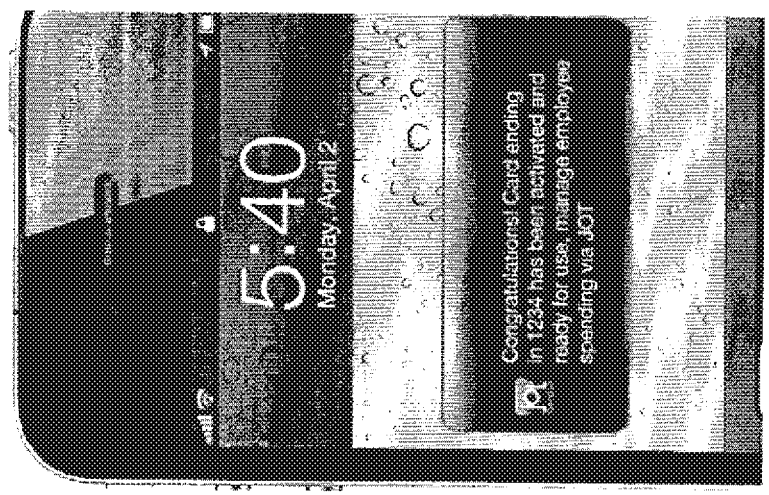
Upon activation Account Owner Receives a push notification
FIG 15

MOBILE FRAUD PREVENTION SYSTEM AND METHOD

RELATED APPLICATIONS

This application is a continuation application of U.S. patent application Ser. No. 13/681,745, filed on Nov. 20, 2012, which is continuation-in-part application of U.S. patent application Ser. No. 12/388,730, filed on Feb. 19, 2009, which is a continuation-in-part application of U.S. patent application Ser. No. 11/952,457, filed on Dec. 7, 2007, all of which are hereby incorporated in their entirety.

CONTINUING DATA

This application is a continuation-in-part application of U.S. patent application Ser. No. 12/388,730, filed on Feb. 19, 2009, which is a continuation-in-part of U.S. patent application Ser. No. 11/952,457 filed on Dec. 7, 2007, (now U.S. Pat. No. 7,949,579) both of which are fully incorporated herein by reference.

TECHNICAL FIELD

Embodiments of the invention are related generally to improved fraud detection systems, particularly in a mobile environment, and to methods for improving a customer experience and in particular to improving customer control of financial accounts.

BACKGROUND OF THE INVENTION

In the emerging global economy, e-commerce and e-business have increasingly become a necessary component of business strategy and a strong catalyst for economic development. The integration of information and communications technology in business has revolutionized relationships within organizations and those between and among organizations and individuals. Specifically, the use of e-commerce and e-business solutions by businesses and individuals has enhanced productivity, reduced costs, encouraged greater customer participation, and enabled mass customization.

E-commerce or e-business solutions may allow an individual to perform financial transactions over the Internet through a secure website. This type of service enables customers to do their banking or financial transaction processing from anywhere where Internet access is available. In many cases, a web browser is utilized and any normal Internet connection is suitable.

In recent years, consumers have drastically reduced the use of cash payment for goods and services and have more frequently relied on credit cards, debit cards, stored value cards, or electronic transfer of funds associated with a financial account to facilitate financial transactions. Financial institutions have begun offering businesses a credit card account that offers account holders the option of shifting invoice-based check spending to a business credit card. For example, business credit cards designed for contractors have the objective of inducing them to do away with invoice-based payments by check and shift to more frequent use of their business credit cards.

Contractors and other businesses frequently make purchases or issue disbursements for multiple projects, clients, or customers in a single financial transaction. When a contractor uses an open-loop credit card to make a single purchase of multiple items for a variety of projects, an electronic billing application generally allows the contractor to view only limited data regarding the transaction (e.g., the date, the name of the vendor, and the total dollar amount charged to the credit card) and to electronically settle payment. A solution has developed as disclosed in parent application, U.S. patent application Ser. No. 11/952,457, now U.S. Pat. No. 7,949,579, which allows a contractor (or other business or individual) to allocate a percentage or dollar amount of the total dollar amount charged to the credit card at a point of sale to a particular project, job, or client matter. As a result, the contractor may need to collect and examine numerous receipts to properly charge clients for items purchased for a particular project.

Given the increased availability of electronic resources, such as financial institution web sites that are available to account holders over the Internet, it is now possible to provide account holders with a real time display of account activity as well as available account options. Although financial institutions have increased the availability of resources to account holders, these resources are generally uniform without regard for individual account holder behaviors and preferences. Co-pending U.S. patent application Ser. No. 12/388,730, filed on Feb. 19, 2009 provides a solution for account holders to enter individual preferences.

While the solution proposed in U.S. patent application Ser. No. 12/388,730, filed on Feb. 19, 2009 provides some ability for account holders to make pre-purchase settings, it does not provide a complete interactive solution to account holders when the system detects activity suspected as fraudulent. While the system may provide users with an alert or deny a transaction based on user settings, it does not allow the user to make instantaneous decisions based on detected activity.

Since mobile devices are more frequently being carried by account holders, it has become increasingly possible for account-holders to receive real-time notifications of account-related activity. Currently, some existing systems provide alerts related to account-related activities. The alerts may be generated via text message, email, or voice mail. Account holders are thereby able to immediately contact the account holding institution if an invalid charge has been made to the account. One problem with the use of existing mobile devices is the difficulty of obtaining the appropriate applications for use in conjunction with a credit card. Typically, when a cardholder actives a card, he is informed over the telephone where the mobile application can be found. Many cardholders simply fail to write down the information and do not remember that the mobile application is available.

Today, most fraud controls in are outbound and include text messaging, email, voice. The users do not have the reciprocal ability to notify the financial institution or card issuer regarding card activity unless they contact customer service calling centers through the traditional phone channels. Accordingly, no automated interactive system is provided for users to control financial account activity.

Furthermore, existing fraud controls are generally post-purchase controls. Users are not provided with the ability to instruct the financial institution to deny purchases or take other specific actions prior to the actual purchases. Typically, users can only contact financial institutions post-purchase to report fraudulent activity.

Thus, while card and electronic payment methods are generally more convenient for both purchasers and vendors, the use of these methods generates increased possibility for difficulties. Such difficulties may include, for example, fraudulent activity on stolen credit cards or stolen account numbers.

Accordingly, a solution is needed that leverages data available to financial institutions for each account holder in order to provide valuable up-to-date information to each account holder in an efficient manner and allows the account holders to take action that will determine an outcome instantaneously. Furthermore, a solution is needed that leverages the data to provide differential data to each account holder dependent upon account holder preferences and further provide the data that can be expanded to display details in order for account holders to view a complete picture of transactions and overall account activity.

In addition to allowing user input regarding account usage, fraud is also reduced by enhancing authentication procedures. Existing authentication procedures such as the requirement for passwords, PINs, and security questions are often susceptible to hackers and are further inconvenient for users who have multiple passwords, and numbers to remember. Accordingly, embodiments of the invention leverage the capabilities of mobile devices in order to provide more convenient and secure authentication procedures.

SUMMARY OF THE INVENTION

In one aspect of the invention, a computer-implemented fraud prevention system is disclosed for preventing fraudulent activity on user accounts, the fraud prevention system interacting with a transaction tracking system for allowing association of transactions with user-defined categories. The fraud prevention system includes a computer memory including at least one database storing system settings specifying account-related events that require fraud prevention action and user-defined settings specifying account-related events that require fraud prevention action, wherein at least one of the user-defined settings pertains to events falling in one of the user-defined categories. The system may additionally include at least one computer processor programmed for detecting occurrence of the account-related events and accessing the system settings and user settings in the computer memory to determine if a fraud prevention action is required in response to the detected account-related event. One or more processors may additionally be programmed to activate a fraud prevention user interface for the user when fraud prevention action is required and receive user instructions through the fraud prevention interface and processing the user instructions.

In an additional aspect of the invention, a fraud prevention method is provided for preventing fraudulent activity on user accounts, the fraud prevention method for interaction with a transaction tracking system for allowing association of transactions with user-defined categories. The fraud prevention method may include storing, in a computer memory, information including at least system settings specifying account-related events that require fraud prevention action and user-defined settings specifying account-related events that require fraud prevention action, wherein at least one of the user-defined settings pertains to events falling in one of the user-defined categories. The method may additionally include implementing at least one computer processor for performing steps including detecting occurrence of the account-related events and accessing the system settings and user settings stored in the computer memory to determine if a fraud prevention action is required in response to the detected account-related event. The method may additionally include implementing one or more processors for activating a fraud prevention user interface for the user when fraud prevention action is required and receiving and processing instructions entered by the user through the fraud prevention user interface.

In yet an additional aspect of the invention, a fraud prevention system is provided for preventing fraudulent activity on user accounts, the fraud prevention system interacting with a transaction tracking system for allowing association of transactions with user-defined categories. The fraud prevention system may include a computer memory including at least one database storing system settings specifying account-related events that require fraud prevention action and user-defined settings specifying account-related events that require fraud prevention action, wherein at least one of the user-defined settings pertains to events falling in one of the user-defined categories. The system may additionally include at least one computer processor programmed for providing a plurality of user interfaces for allowing the user to create the user-defined settings, wherein the user-defined settings include card controls for allowing activation and deactivation of multiple cards associated with an account, pre-purchase security settings for enabling the user to notify an account holding institution of events including travel, a large upcoming purchase, and post purchase security settings for enabling the user to dispute a charge, freeze an account, and report a stolen bankcard.

In yet a further aspect of the invention, a fraud prevention method is provided for preventing fraudulent activity on user accounts, the fraud prevention method for interaction with a transaction tracking system for allowing association of transactions with user-defined categories. The fraud prevention method may include receiving from a purchaser by at least one computer processor at a point-of sale, a signature gesture and using the signature gesture as an authentication factor for authenticating the purchaser. The method may additionally include storing, in a computer memory, information including at least system settings specifying account-related events that require fraud prevention action and user-defined settings specifying account-related events that require fraud prevention action, wherein at least one of the user-defined settings pertains to events falling in one of the user-defined categories. The method may further include implementing at least one computer processor for performing steps including detecting occurrence of the account-related events and accessing the system settings and user settings stored in the computer memory to determine if a fraud prevention action is required in response to the detected account-related event. The method may additionally include activating a fraud prevention user interface for the user when fraud prevention action is required and processing user instructions entered through the fraud prevention user interface.

BRIEF DESCRIPTION OF THE DRAWINGS

The present invention is described in detail below with reference to the attached drawings figures, wherein:

FIG. 7 illustrates a user interface for personalizing and controlling triggers for fraud protection in accordance with an embodiment of the invention;

FIG. 12 is a screen shot illustrating an online application for use in conjunction with the secure mobile application distribution and card activation method in accordance with an embodiment of the invention;

FIG. 13 is a screen shot illustrating secure mobile distribution in accordance with an embodiment of the invention;

FIG. 14 is a flow chart illustrating a method for secure activation in accordance with an embodiment of the invention; and FIG. 15 is a flow chard illustrating a method for secure activation in accordance with another embodiment of the invention.

DETAILED DESCRIPTION OF PREFERRED EMBODIMENTS

Embodiments of the present invention are directed to a method and system for fraud prevention and security for financial accounts, with particular application to the mobile device environment. One object of the current innovation is to expand the existing systems to allow for proactive consumer prevention of fraud. Embodiments of the invention facilitate push notification so that mobile users can take action on the notification. Furthermore, embodiments of the invention enable proactive notification that can occur pre-purchase in addition to post-purchase reactive notification. The consumer may adjust settings in advance to reflect plans such as a major trip or a large purchase.

Figure 1:
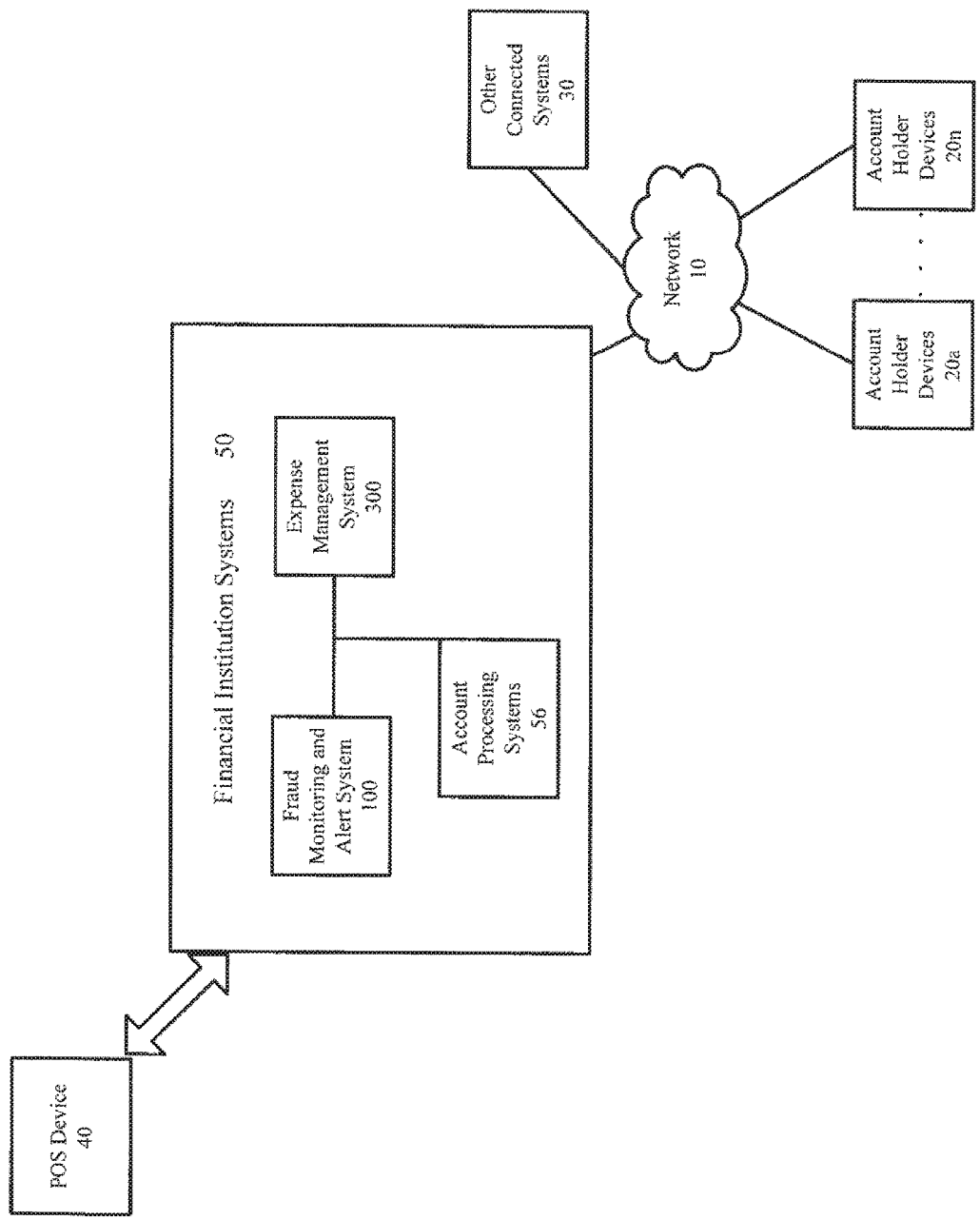
FIG. 1 is a block diagram illustrating an operating environment for a fraud monitoring and alert system in accordance with an embodiment of the invention.

FIG. 1 is a block diagram illustrating an operating environment for a fraud monitoring and alert system 100 in accordance with an embodiment of the invention. The fraud monitoring and alert system 100 may be connected with other financial institution systems 50. The financial institution systems 50 may include, for example account processing systems 56 and an expense management or transaction tracking system 300. One or more point of sale (POS) devices 40 may be operatively connected with the financial institution systems 50. Other systems 30 and account holder devices 20a . . . 20n may be connected over a network 10 with the financial institution systems 50. Although illustrated as separate systems, in embodiments of the invention, the fraud monitoring and alert system 100 and other financial institution systems 50 may be integrated so as to form a unitary system.

The network 10 may for example include the Internet. Although the various systems are shown as connected over one network, they may instead be connected over multiple networks.

The financial institution systems 50 provide the account holder systems 20a . . . 20n with account information when requested. In the illustrated environment, the account processing systems 56 may cooperate with the fraud monitoring and alert system 100 to provide the account information to account holder devices 20a . . . 20n. The account processing systems 56 typically also provide monthly or other periodic statements to the account holder systems 20a . . . 20n and provide payment information to merchants or POS systems 40. The account processing systems 56 may further share purchase information and other relevant information with other connected systems 30, such as partner systems. The account processing systems 56 may be or include systems currently known in the art for managing financial accounts. The accounts may include, for example, credit, debit, stored value, checking, savings, or other financial accounts. Thus, accounts may be associated with a card, such as a credit card, a debit card, a stored value card, or other type of card.

The POS devices 40 may encompass merchant systems including both traditional POS devices and include online shopping systems accessible via the network 10 or another network. The merchant systems may further be connected to POS devices in retail environments. In the illustrated environment, the fraud monitoring and alert system 100 is capable of collecting information from and distributing information to other systems 30 and merchant systems 40.

The expense management system 300 may be configured substantially as described below with respect to FIG. 3. The expense management system 300 enables users to receive line item data regarding expenses and allows categorization of expenses into pre-configured categories, which may be user-defined. Although the system 300 is described herein as an expense management system, it may be used to perform any number of tasks, such as, for example, tracking transactions and/or putting the tracked transactions into categories, or simply for monitoring activity related to one or more accounts.

The account holder devices 20a . . . 20n are preferably mobile devices such as smart phones or tablets, but may include any other mobile device or computer system configuration, including, but not limited to: hand-held wireless devices such as mobile phones or PDAs, multiprocessor systems, microprocessor-based or programmable consumer electronics, minicomputers, mainframe computers, personal computers, and the like. The account holder devices 20a . . . 20n may execute downloadable applications for operating in conjunction with the expense management system 300. The downloadable applications may be stored in memory on the holder devices 20a . . . 20n and may provide a plurality of user interfaces on the account holder devices 20a . . . 20n. The user interfaces may be or include those user interfaces illustrated in FIGS. 4-8 and described herein. In embodiments of the invention, the applications may be downloaded from financial institution systems 50, such as from the fraud monitoring and alert systems 100, the expense management system 300, or the account processing systems 56.

Other connected systems 30 may be or include merchant or partner systems. These systems may provide information regarding purchases, and may interface with POS systems and/or financial institution systems.

All of the aforementioned systems are computing systems with processing components and are connected over the network. The computing systems may be any of the known types of computing systems as will be further described below.

Figure 2:
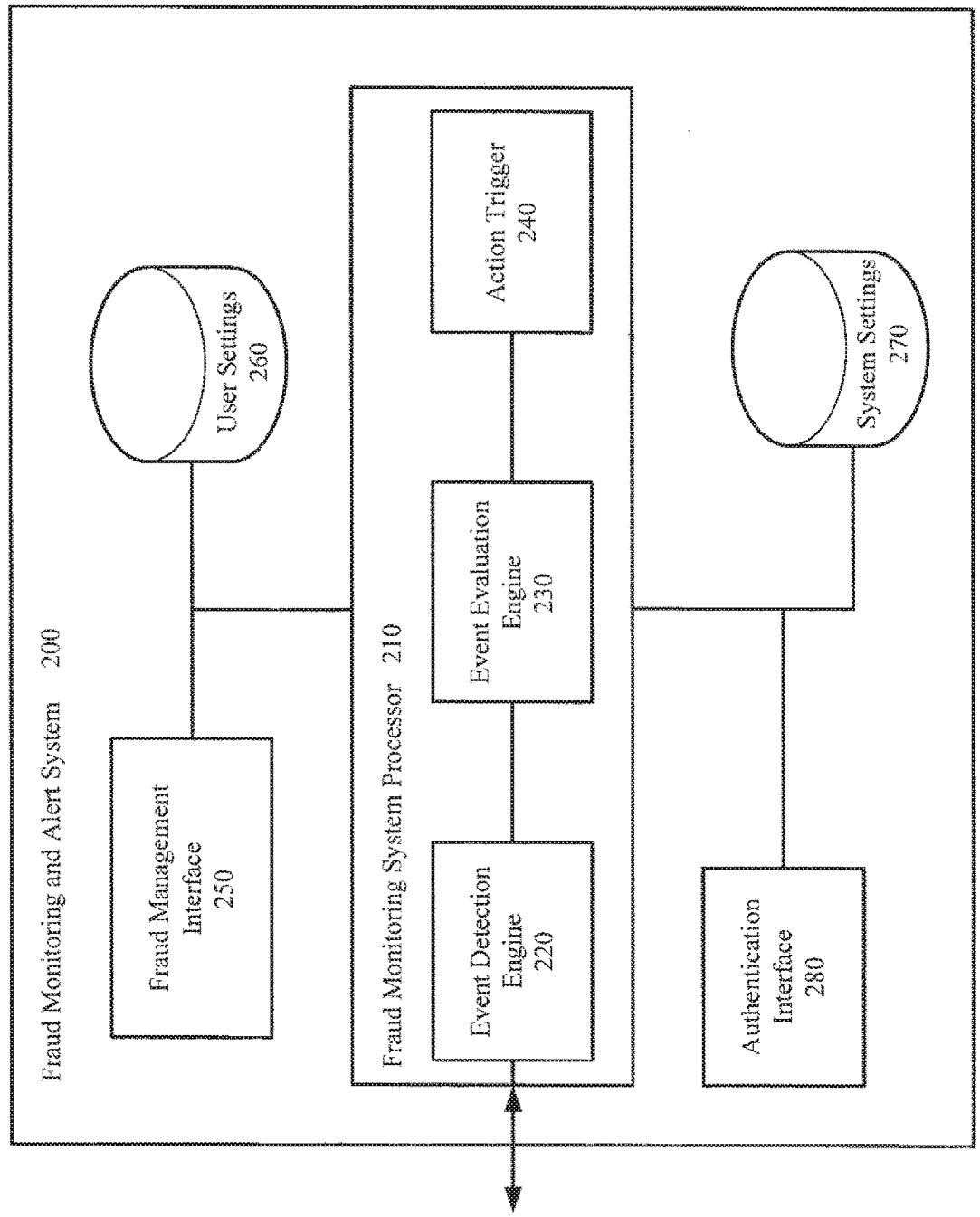
FIG. 2 is a block diagram illustrating components of a fraud monitoring and alert system in accordance with an embodiment of the invention.

FIG. 2 is a block diagram illustrating components of a fraud monitoring and alert system 200 in accordance with an embodiment of the invention. The fraud monitoring and alert system 200 may include a fraud monitoring system processor 210 including an event detection engine 220, event evaluation engine 230, and action trigger 240. The fraud monitoring system processor 210 may receive information from a fraud management interface 250 and authentication interface 280. Stored information may be contained in databases in computer memory and may include system settings 270 and user settings 260.

The fraud monitoring system processor 210 may execute software components to evaluate received information regarding account activity and determine if any action is required to prevent fraud. The fraud monitoring system processor 210 may access stored settings to determine if action is necessary. Furthermore, the fraud monitoring system processor 210 may receive instructions from a system user through provided user interfaces such as those displayed in FIGS. 4-9 and trigger fraud prevention actions based on these instructions. The fraud monitoring system processor 210 may be or include a computer processor programmed to perform the described functions.

The event detection engine 220 may detect account activity or may interface with account processing systems in order to receive account activity notifications. The activities may include, for example, card activation and purchasing activity.

The event evaluation engine 230 interfaces with the event detection engine 220 to access stored rules and determine if the events detected are in accordance with stored rules. For example, the event evaluation engine 230 may determine if a purchase exceeds a pre-set limit. The even evaluation engine 230 may further determine, for example, if a purchase is made with a frozen account. Thus, the action trigger 240 may respond to post-purchase input from users to take immediate action.

The action trigger 240 triggers appropriate anti-fraud action if the event evaluation engine determines that rules have been violated. The action may include, for example, a notification to the account holder or decline of an attempted purchase transaction. The action trigger 240 may operate in response to cardholder input through the user interfaces in order to freeze accounts, alter spending limits, or perform other actions.

The fraud management interface 250 may provide account holders with an interface for providing instructions to the system. In embodiments of the invention, the instructions may be post-purchase instructions and/or pre-purchase instructions. In the case of post-purchase instructions, the system may take immediate action, such as, for example launching a purchase dispute. In the case of pre-purchase instructions, the system may determine compliance through the use of the event detection engine 220 and the event evaluation engine 230 as described above.

The user settings 260 may be made through the fraud management interface 250 and may be stored for access by the fraud monitoring system processor 210. The system settings 270 may be pre-set in the system or pre-determined by a system administrator based on account type or other factors.

The authentication interface 280 may be provided to authenticate an account holder identity prior to granting access to the system. In addition to the login credentials often required to access a mobile device, account holders are required to authenticate themselves to the system provided by the financial institution.

In embodiments of the invention, the authentication interface may require a user name and password and may additionally require answers to security questions. In other embodiments, the authentication interface 280 may accept a signature gesture from the user. The signature gesture may be stored on the system for comparison with the user's gesture. The gesture may be executed through moving the mobile device of the user in a signature pattern.

The authentication interface 280 may utilize image capture and analysis technologies to recognize a user's hand as a controller. Input may occur through the user making the signature gesture with his hand in front of the image capturing components of the users' mobile device, such as the camera of an iPhone. Furthermore, the authentication interface 280 may respond to both gestures and voice control. Mobile devices may be equipped with both motion detectors and voice capture features so that the authentication interface 280 is able to collect the required information. For example, a user might draw a figure eight and speak a signature phrase in order to sign onto online banking. The mobile device itself therefore might operate as a controller. The system can also implement security features at the point of sale. A cardholder may provide settings for a unique signature motion or gesture for authentication at the point of sale. The system can leverage the motion detection feature within device to collect a signature with the mobile device used as a controller. In this embodiment, characteristics of the device as well as other heuristics could supplement authentication credentials. The other information could include for example, geographic location or time of day. In yet further embodiments, sensing equipment at the POS could detect hand gestures in the absence of a mobile device.

Accordingly, features such as cameras, gyroscopes, accelerometers, magnetometers, and other sensing devices may be integrated with computing devices such as smart phones and tablets and can be implemented to authenticate a user by recognizing signature gestures or characteristics. The gestures may be made, with fingers, hands, arms, legs, or with the mobile device itself. Hand gestures may include virtually any gesture that can be made with a hand, such as a drum beat, a figure eight, sign language gestures, twirling of a pen or pencil, drawing of one or more letters, or finger tracing of an object, or a shape, such as a square, a circle, or a cross. Alternatively to the formation of gestures in the air, a gesture may incorporate a user's finger motion on a touch screen. Multiple gestures may be used in combination to authenticate users. Alternatively, a single gesture may be used in combination with a biometric identifier.

Furthermore, users may personalize or individualize each device by associating each device with a unique signature. For example, a user may select one gesture for an iPhone™, another for an iPad™, and yet another for an Android™ device. Thus, a user profile may be established with multiple devices and multiple signatures.

As an additional option, a user may create a profile with multiple gestures including high security gestures, medium security gestures, and low security gestures. The high security gestures may include a combination of gestures or other authentication measures and may be used for high risk transactions, such as transactions involving transfer of funds or withdrawal of funds. Risk may also be evaluated based on geo-location enabled by the mobile device, such that specific transactions from specific locations may require a high degree of authentication In additional embodiments of the invention, certain low-risk actions may circumvent the authentication process. For example, if an account holder receives a purchase notification from a financial institution and wants to tag the purchase in order to place it in a category, the authentication interface may be suppressed. In this instance, since the system pushed the notification to the user, the system is aware of the identity of the account holder. Because tagging a purchase causes a relatively low risk to the user account compared to an action such as a purchase or a funds transfer, the user may be permitted to perform the action without authenticating him or herself to the system. Another low risk action may include, for example, the capture of line item data. If a user takes a photograph of a receipt and wants to store the receipt with its line item data in the system, the authentication interface may again be suppressed. Again, in this situation, since a purchase has occurred and the user is associated with the purchase, the system is aware of the identity of the user and the entry of the line item data is a low risk account action.

Figure 3:
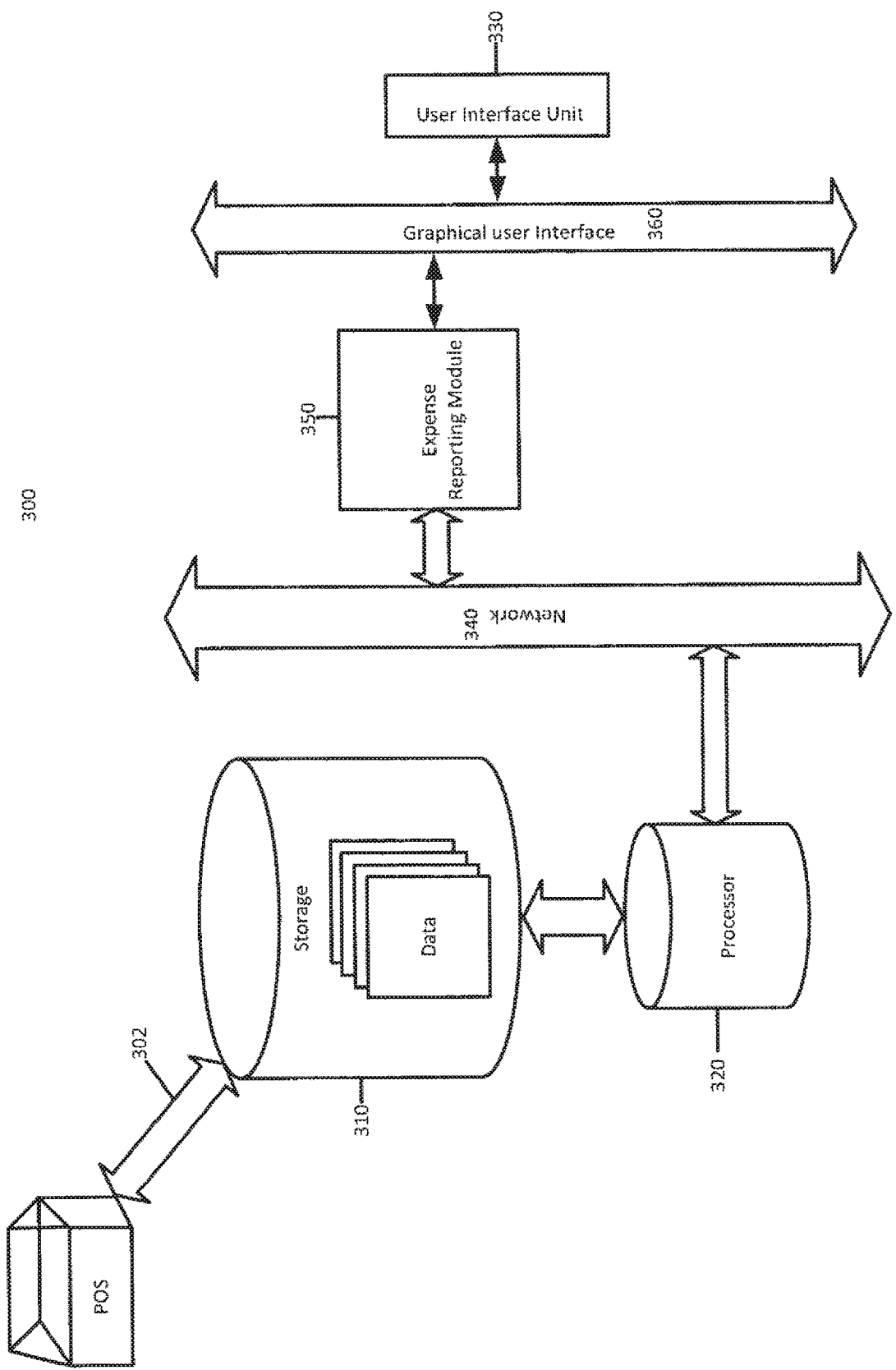
FIG. 3 is a block diagram illustrating an expense management or transaction tracking system that may be implemented in combination with embodiments of the invention.

FIG. 3 is a block diagram illustrating an expense management system as disclosed in parent application Ser. No. 11/952,457 filed on Dec. 7, 2007, that may be implemented in combination with embodiments of the invention. While this application describes a system that has particular application to contractors, it may also be used by other businesses and even by families to monitor transactions on accounts. This system architecture includes a data storage unit 310 connected to a processor 320, wherein the processor 320 is addressable by a user interface unit 330 via a network 340. The system architecture further includes an expense reporting module 350 and a graphical user interface ("GUI") 360 for display on user interface unit 330.

Financial transaction data is stored on a data storage unit 310. Financial transaction data is electronic data representing any type of financial transaction, including, but not limited to: purchases, loans, mortgages, bank account transactions, credit card transactions, charge card transactions, debit card transactions, stored value card transactions, like-kind transactions, payments in exchange for services rendered, disbursements, etc.

In one embodiment, financial transaction data may be created in connection with use of a payment device in any transaction processing system 300 known in the art. The payment device used in the transaction processing system may be any of a variety of devices. For example, the payment device may be a credit card, a smart card. RFID card, other funds card, a special device for effecting internet purchases, a program operating on a computer system, a key FOB, a device with a bar code, a phone, a device in a keychain, a processing component in an personal music device and/or any other payment device that is used by a user to effect a transaction. Further, the particular payment device may utilize a variety of technologies to interface with the transaction processing system. Such interface used by the payment device may include magnetic stripe technology, wireless technology and/or a computer network, for example.

When a payment device is used in a financial transaction at a payment device activated terminal (e.g., automated teller machine ("ATMs"), point of sale ("POS") terminal, and the like), the transaction processing system 300 processes and stores financial transaction data relating to the transaction, for example, a customer's account information and the amounts to be charged to a customer's account (and credited to an account of a merchant). In addition to the customer's account information, the financial transaction data may also represent more detailed or "line-item" information regarding the transaction, including: purchase data, product data, product quantity data, purchase date data, purchase price data, merchant data, part number data, product name data, stock keeping unit (SKU) number data, receipt number data, universal product code data, barcode data, fee data, interest rate data, interest data, balance data, balance transfer data, debit card data, check data, line of credit access card data, and line of credit transaction card data, etc.

In one embodiment where the payment device is a credit card, a merchant's POS terminal reads information stored on the credit card, and software at the POS terminal communicates the credit card information and other financial transaction data in real-time to a financial institution or acquirer (e.g., bank, building society, thrift, credit union, stock brokerage, asset management firm, or other credit card issuing business) via the transaction processing system 300 (e.g., a credit card payment gateway, a VISA® Association network, etc.). In addition to the credit card information, the POS terminal software may further transmit detailed line-item transaction data to the financial institution in real time via the transaction processing system 300.

In another embodiment, the merchant performs a "capture routine" at the end of each day where the merchant transmits details on all completed credit card transactions for settlement with the financial institution via the transaction processing system 300. In this embodiment, the merchant may also transmit line-item transaction data along with the day's transaction data to the financial institution during settlement.

In a further embodiment, the financial institution may access line-item data regarding a customer's credit card transaction through an intermediary database. For example, the financial institution requests an intermediary data broker to obtain line-item data from a merchant regarding a particular customer's credit card purchase. The intermediary data broker obtains the requested data via a network from the merchant's mainframe, databases, or POS terminal, and thereafter transmits the line-item data to the financial institution.

In another embodiment, the merchant's POS terminal software accesses an intermediary database when processing a customer's transaction to obtain line-item data about a purchase in real time. For example, when processing a debit card purchase, the software accesses an inventory information approval system ("IIAS") to obtain product information from the IIAS database. The POS then transmits the transaction details along with the retrieved line-item data to a financial institution via the transaction processing system 300.

In a further embodiment, a customer or purchaser transmits line-item data about a purchase directly to their financial institution via a personal device such as a cell phone, Blackberry®, smart phone, PDA, etc. connected to a network. In this embodiment, the purchaser directly inputs UPC, SKU, or other data into the personal device while shopping, and thereafter transmits the data to the financial institution. Alternatively, while processing the purchase a POS terminal transmits line-item data wirelessly from the merchant's database directly to the customer's personal input device (e.g., via Bluetooth. RFID, infrared, etc.). The customer then transmits the data directly from the input device to the financial institution. In a further embodiment, the merchant's POS terminal transmits line-item data about a customer's purchase via electronic mail directly to the customer and/or the financial institution.

Once received, the financial institution stores the customer's financial transaction data in data storage unit 310 for use in connection with a service (e.g., expense reporting, e-banking, internet banking, e-statements, e-commerce, business-to-business (B2B) transactions, business-to-consumer (B2C) transactions, internet sales, or others known in the art). Among other things, the service may allow a customer to view financial transaction data via a user interface unit 330, described more fully herein.

The data storage unit 310 is connected to a processor 320. The processor executes commands and instructions, and may be a general purpose computer, but may utilize any of a wide variety of other technologies including: a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

The processor 320 is addressable by a user interface unit 330. User interface unit 330 may exchange data with the processor 320 in a distributed computing environment linked through a communications network 340 (e.g., the Internet). User interface unit 330 may include any hardware, software, or combination of hardware and software that allows a user to interact with the processor 320. For example, user interface unit 330 may be any computer system configuration, including, but not limited to: handheld wireless devices such as mobile phones or PDAs, multiprocessor systems, microprocessor-based or programmable consumer electronics, minicomputers, mainframe computers, personal computers, and the like. User interface unit 330 may also include any of a mouse, touch screen, keyboard, voice reader, voice recognizer, dialogue screen, menu box, list, checkbox, toggle switch, a pushbutton or any other device that allows a user to receive information regarding the operation of the processor 320 as it processes a set of instructions and/or provides the user interface unit 330 with data or information. Accordingly, the user interface unit 330 is any device that provides communication between a user and a processor 320. Information provided by the user to the processor 320 through the user interface unit 330 may be in the form of a command, a selection of data, or some other input, for example.

As discussed above, the user interface unit 330 is typically used for interacting with the processor 320 either to convey information or receive information. However, it should be appreciated that in accordance with some embodiments of the system and method of the invention, it is not necessary that a human user actually interact with processor 320. Rather, it is also contemplated that the processor 320 of the invention might interact. i.e., convey and receive information, with another processing machine, rather than a human user. Accordingly, the other processing machine might be characterized as a user. Further, it is contemplated that a processor 320 utilized in the system and method of the invention may interact partially with another processing machine or processing machines, while also interacting partially with a human user.

The financial transaction management system as shown in may be practiced with various computer system configurations and may be described in the general context of computer-executable instructions, such as program modules, being executed by a computer. Generally, program modules include routines, programs, objects, components, data structures, etc. that perform particular tasks or implement particular abstract data types. In a distributed computing environment, program modules may be located in both local and remote computer storage media including memory storage devices.

In one embodiment, the system of the present invention includes an expense reporting module 350 enabling a user to organize financial transaction data into categories. The expense reporting module 350 may be stored in a computer memory, preferably a RAM (not shown), so as to be easily accessible to the processor 320 or other processing unit.

The expense reporting module 350 may further enable a user to define one or more project categories. A project category may be any designation defined by a user to organize, systematize, classify, or categorize financial transaction data represented by financial transaction data representations. For example, a user may desire to categorize financial transaction data by project, matter, job, client, number, customer, and the like.

Although the aforementioned components are shown as discrete modules, each of the modules may alternatively be integrated with one another. If the modules are discrete, multiple modules may operate cooperatively as will be further explained below.

The components shown in FIGS. 1-3 above may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that perform particular tasks or implement particular abstract data types.

The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL. Basic, C, C++, COBOL, dBase, Forth, Fortran, Java. Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 4:
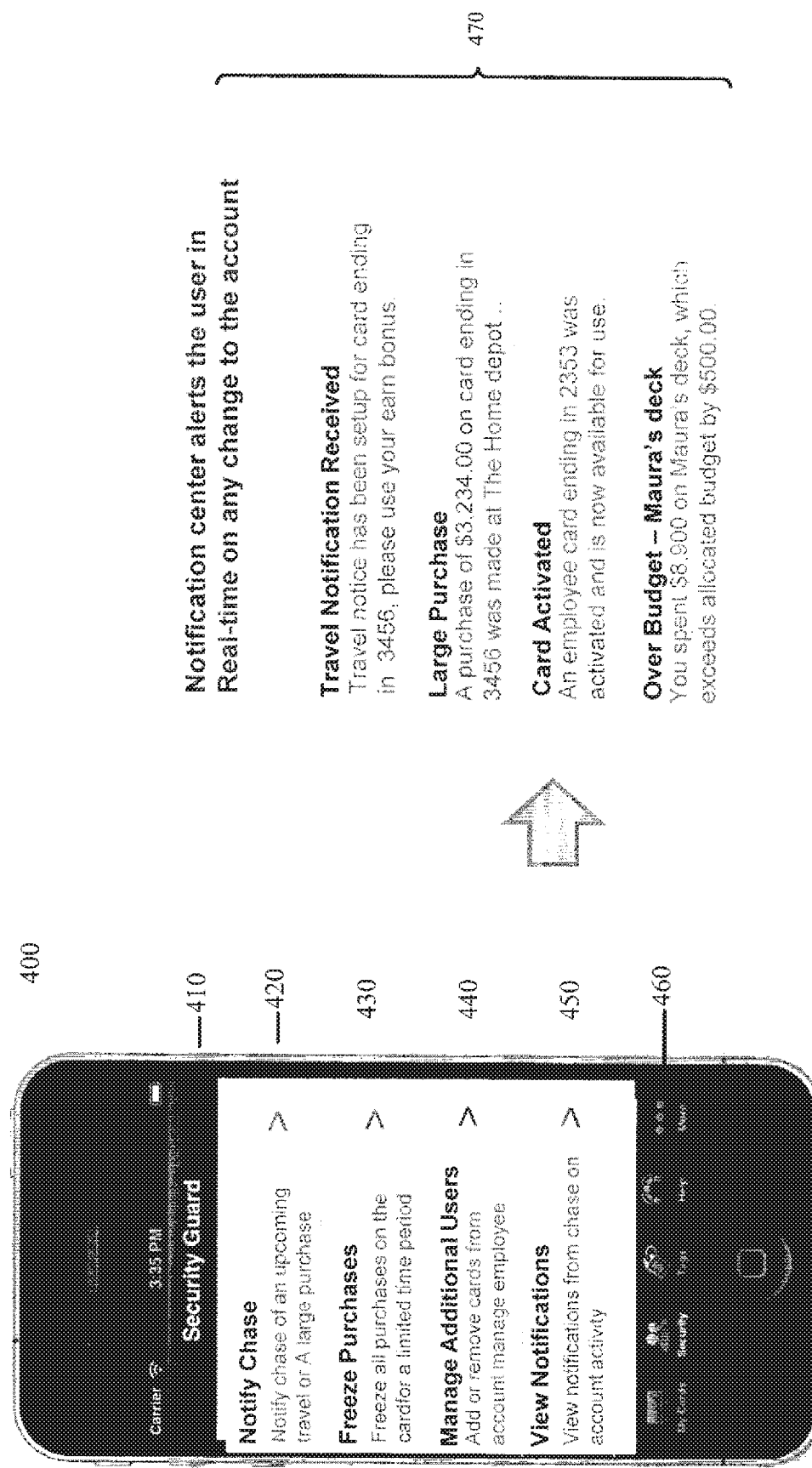
FIG. 4 is a screen shot illustrating a user interface for pre-purchase security controls in accordance with an embodiment of the invention.

FIG. 4 is a screen shot illustrating a user interface 400 for pre-purchase security controls in accordance with an embodiment of the invention. The user interface 400 displays a security guard screen 410. The security guard screen 410 may include selectable options. The selectable options may include, for example, a "Notify" option 420 allowing the user to notify a financial institution of upcoming travel, a large upcoming purchase or other significant events. The selectable options may also include a "Freeze Purchases" option allowing a user to instruct the financial institution to freeze purchases made with a particular card. The selectable options may also include a "Manage Additional Users" option 440 that allows a user to remove cards managed for others, such as cards used by employees on a corporate account. The "Manage Additional Users" option may also allow for adding additional cards to an account.

A "View Notifications" option 450 may be provided to allow a user to view any notifications provided by the financial institution. The "View Notifications" option is expanded at 470. Notifications may be provided in real time, and may include, for example, a travel notification, a large purchase notification, an activation notification, or an over budget notification for advising the user that a budget has been exceeded on a particular project. Other notifications may also be provided.

Selectable options 460 show that the security screen option has been selected. However, a user can switch to the "My Cards" option, further described below with respect to FIG. 5, or one of the other options provided. "More" options may also be available.

Figure 5:
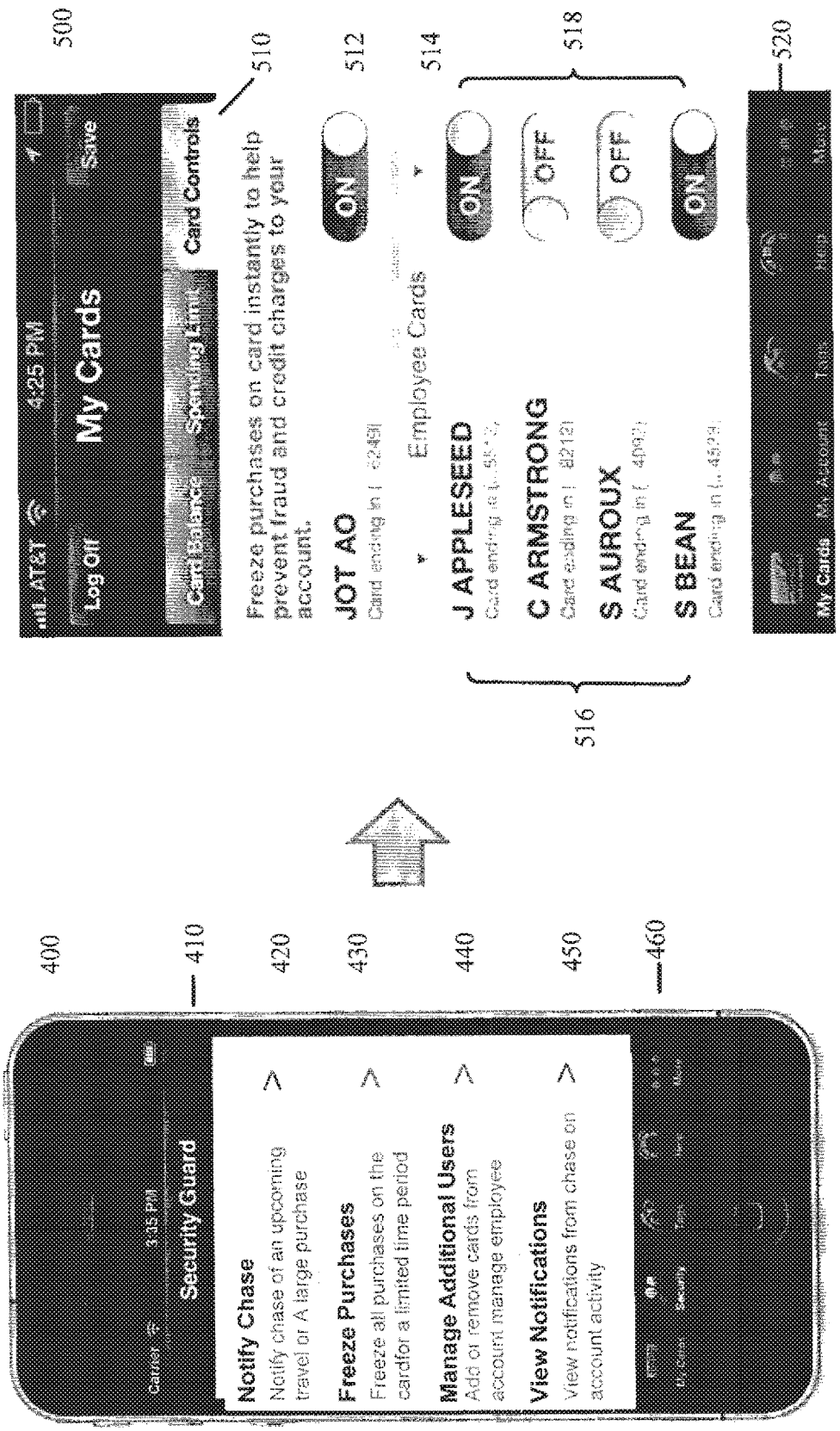
FIG. 5 is an additional screen shot illustrating pre-purchase security controls in accordance with an embodiment of the invention.

FIG. 5 is an additional screen shot illustrating pre-purchase security controls in accordance with an embodiment of the invention. FIG. 5 shows the expansion of the "Freeze Purchases" option 430 to lead to a "My Cards" interface 500. The "My Cards" interface may provide access to activity related to a primary card, but may also provide access to information related to other cardholders such as employees or family members. The user may receive alerts on purchases of others and be able to turn card off and on. For example, when an employee purchase is declined, the system may advise the primary cardholder from the organization that an employee purchase was declined and ask if the primary cardholder would like to raise the spending limit.

Card controls 510 allow a user to turn various cards on and off. For example, a primary account card "JOT AO" may be turned on at 512. However, employee cards 514 may be listed at 516 and may be selectively activated and deactivated at 518. Options 520 illustrate that the "My Cards" interface is displayed.

Thus, on addition to alerts generated for the primary cardholder, alerts to a primary cardholder could also be generated for expenditures of employees or family members and if the cardholder detects fraudulent activity, he may be able to turn the subject card on or off. Furthermore, when an employee purchase is declined, the system can notify the organization and ask for input.

Figure 6:
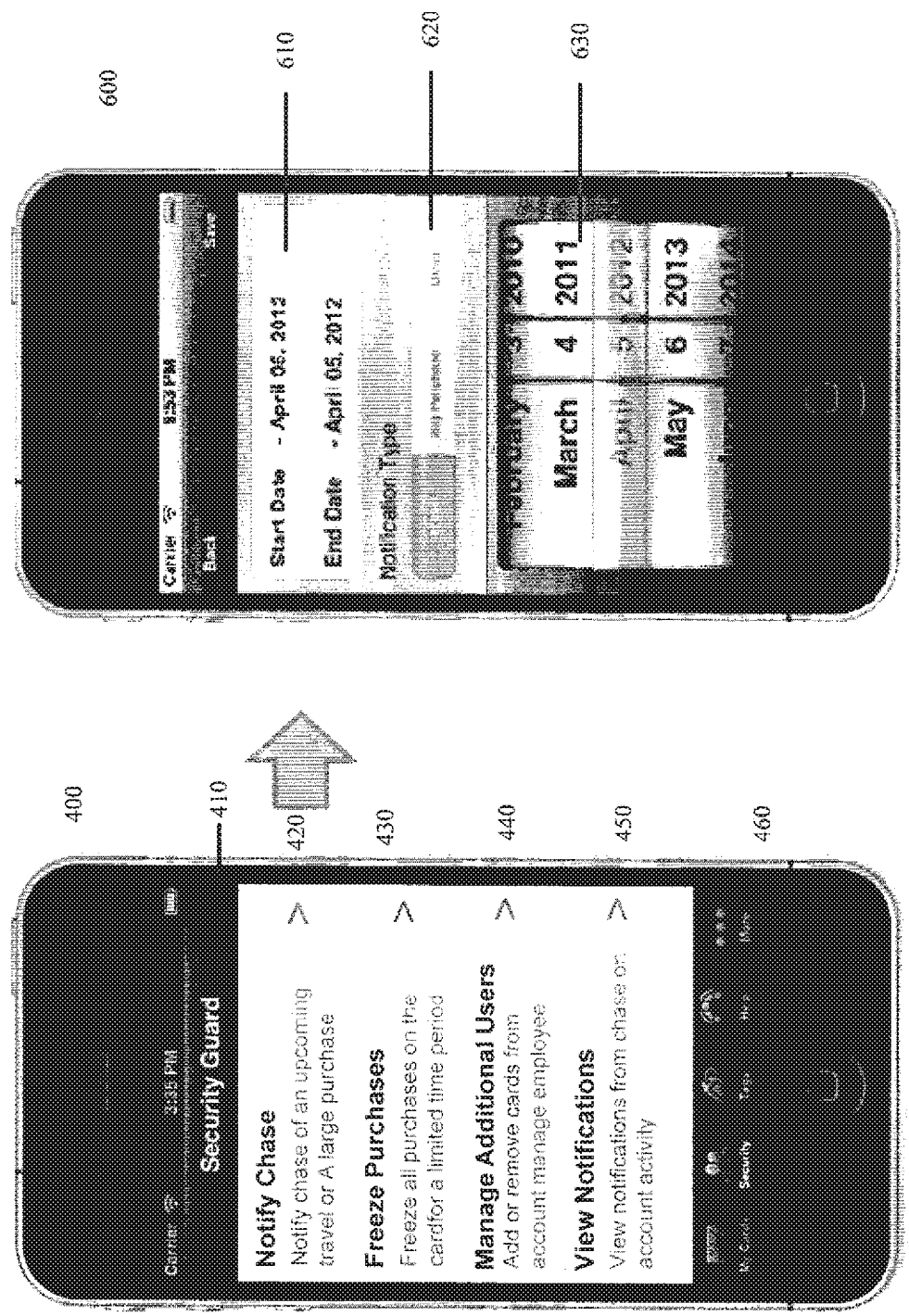
FIG. 6 is an additional screen shot illustrating pre-purchase security controls in accordance with an embodiment of the invention.

FIG. 6 is an additional screen shot illustrating pre-purchase security controls in accordance with an embodiment of the invention. FIG. 6 illustrates a user interface 600 that appears when the "Notify" option 420 is selected from FIG. 4. The user interface 600 may provide a selectable start and end date 610, a notification type selector 620 and a date selector 630. The notification type 620 may include for example travel, large purchase, or other notification.

FIG. 7 illustrates a fraud guardian user interface for personalizing and controlling triggers for fraud protection in accordance with an embodiment of the invention. The fraud guardian interface 700 may include multiple selectable user options, such as an amount 702, a point of sale 710, a geographic location 720, categories 730, and a merchant 740. Through these selectable options, the account holder may choose to prohibit specific combinations of features in order to protect his or her account from fraudulent use. For example, in the displayed embodiment, the scenario 750 shows that the account holder never wants to allow amounts of $500 or greater to be charged from a POS terminal for any category or merchant at an out of state location. A rule creation button 760 allows creation of multiple prohibited or restricted scenarios that may be monitored by the fraud monitoring and alert system. For example, a user may want to prohibit all international transactions or prohibit any purchases through online auctions. Thus, the fraud monitoring and alert system may also communicate with the card issuer system in order to provide notification of transactions that should be disallowed.

Typically, financial institutions have their own fraud prevention policies in place. The disclosed fraud protection interface 700 provides supplemental fraud protection by allowing an account holder to select prohibited scenarios. The fraud monitoring and alert system either monitors account holder behaviors or receives reports of such behaviors from other account related systems. Accordingly, the fraud monitoring and alert system detects discrepancies and can display these discrepancies to the account holder and further may be enabled to block account access or notify the card issuer system to block account access or disallow a transaction based on the restrictions maintained by the account holder.

Thus, the fraud guardian interface 700 includes a user specified set of conditions under which transactions should be disallowed. Thus, account holders have personal control over fraud notifications and policies. Thus, the system offers a sense of control and confidence to account holders by giving them the ability to prevent unnecessary application of fraud policies.

Figure 8:
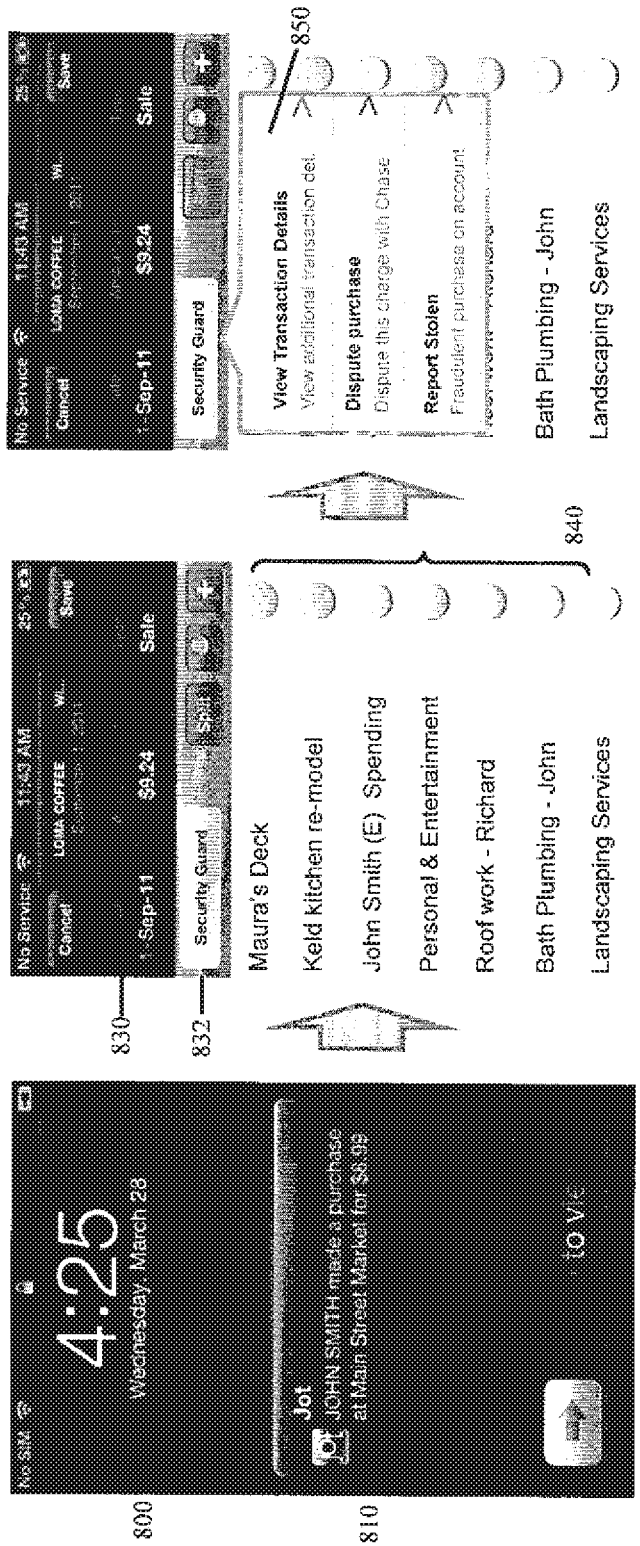
FIG. 8 illustrates a user interface for post-purchase security controls in accordance with an embodiment of the invention.

FIG. 8 illustrates a user interface for post-purchase security controls in accordance with an embodiment of the invention. Whereas FIGS. 4-7 focus on pre-purchase security controls. FIG. 8 provides a plurality of post-purchase interfaces. An interface 800 illustrates a purchase notification 810. Upon selecting the purchase notification, the user can see particulars 830 of the purchase. The particulars may include a date, a total amount of sale, and a type of sale. A security guard interface 832 may display multiple categories 840 to which the purchase may be allocated. A pull down menu 850 may provide the user with post-purchase options for guarding against fraud. The options may include, for example, viewing additional transaction details, disputing the purchase, and reporting a stolen card or stolen card information. As set forth above, in embodiments of the invention, authentications requirements may be avoided if the user simply wants to tag the purchase for inclusion in one of the displayed categories.

While currently existing systems may provide alerts, the alerts often do not contain much information. For example, a user may receive an alert that a purchase has been made. If the user does not recognize the purchase, he may deem it to be fraudulent, when in reality, the alert simply doesn't contain sufficient information to allow the user to recognize the purchase. Thus, alerts in the context of the invention may allow a user to drill down to view additional details. For example, the user may be able to drill down to determine that the payment is actually a recurring payment. In embodiments of the invention, the additional information may be the user's own notes or for recurring purchases, the user may be permitted to tag a purchase in advance of the purchase so that the notification provides the user with the category information as well.

Notifications provided to users may vary based on the user's mobile device, for example, the scale and formatting of input interfaces may vary depending on whether the user is employing an iPad, iPhone, tablet, or other mobile device. With a larger screen, such as for a tablet device, the system may provide more interactive drill-downs with additional levels. With a tiny screen, interaction may be minimized. The notifications may be further adapted for larger electronic devices such as televisions or large monitors associated with personal computers. In this instance, the notifications may flash across the larger screens. Furthermore, when the device has the capability, interaction may be provided through voice channels.

In addition to purchase notifications, the notifications may include reminders, such as a reminder to submit expenses to a client. Notifications may not only include notifications that payments were made, but also notifications that a payment was received. Received payments may also be tagged. For example, the user may tag the received payment as being from Maura for Maura's deck. In embodiments of the invention, when the user generates an invoice, he may also tag the invoice, or simply include sufficient information through inserting notes so that the payment can easily be tagged. Accordingly, the notification system and tagging of payments facilitates budget tracking for the user. The user interfaces may provide a budget bar graph for the user so that the user can compare payments received to payments made based on tags in the system.

Figure 9:
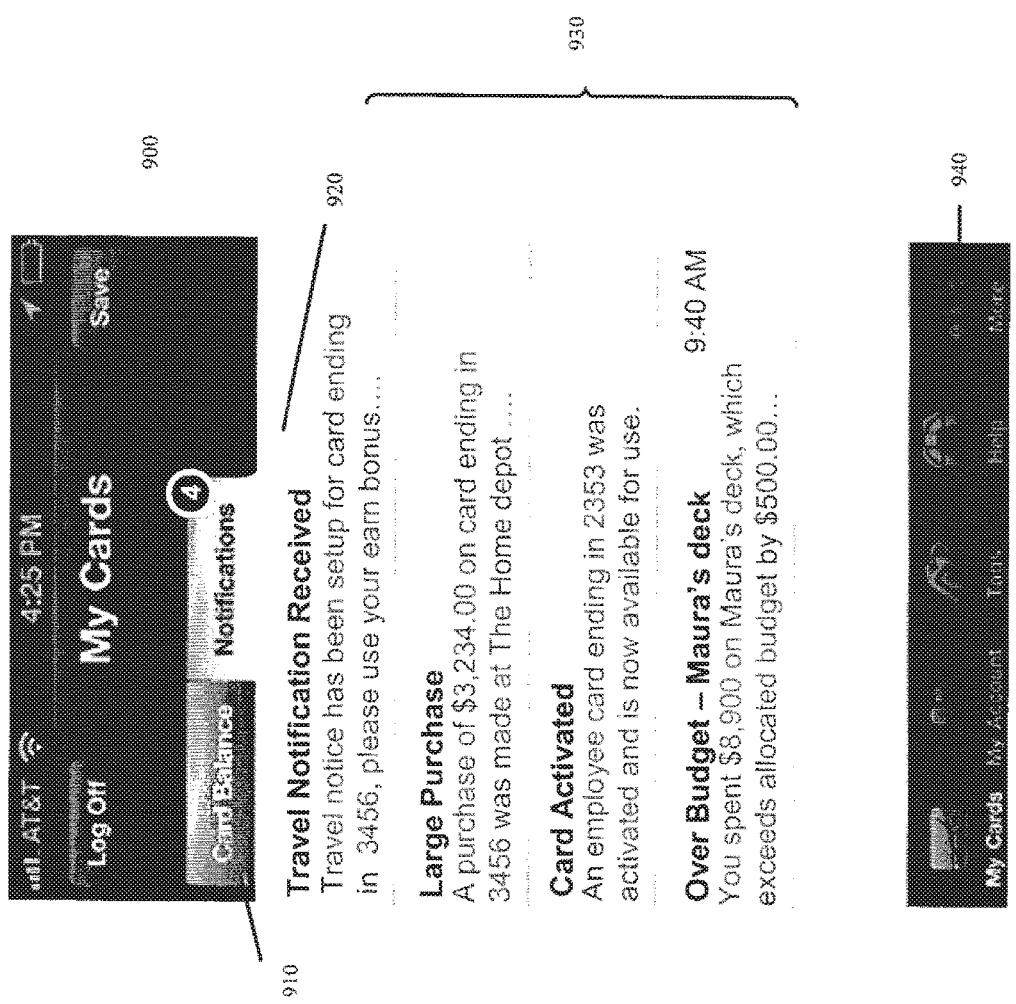
FIG. 9 is a user interface illustrating notification mechanisms in accordance with an embodiment of the invention.

FIG. 9 is a user interface illustrating notification mechanisms in accordance with an embodiment of the invention. A "My Cards" interface 900 illustrates a card balance interface 910 and a notifications interface 920. The notification interface 920 may include multiple notifications 930 relevant to the cardholder account. For example, the notifications may include a travel notification, a large purchase notification, a card activation notification, and/or an over budget notification. These notifications are preferably provided in real time.

Alerts also be delivered in such a manner that they can be prioritized. For example, alerts can be shown as high priority or the alerts can be accompanied by sounds indicating a priority. The system may provide unique sounds for capturing user attention. For example, higher priority alerts could be accompanied by five alarm fire sirens or tornado sirens. Alerts may further be customizable to allow user preferences to govern how high alerts, low alerts, and medium alerts are generated.

Figure 10:
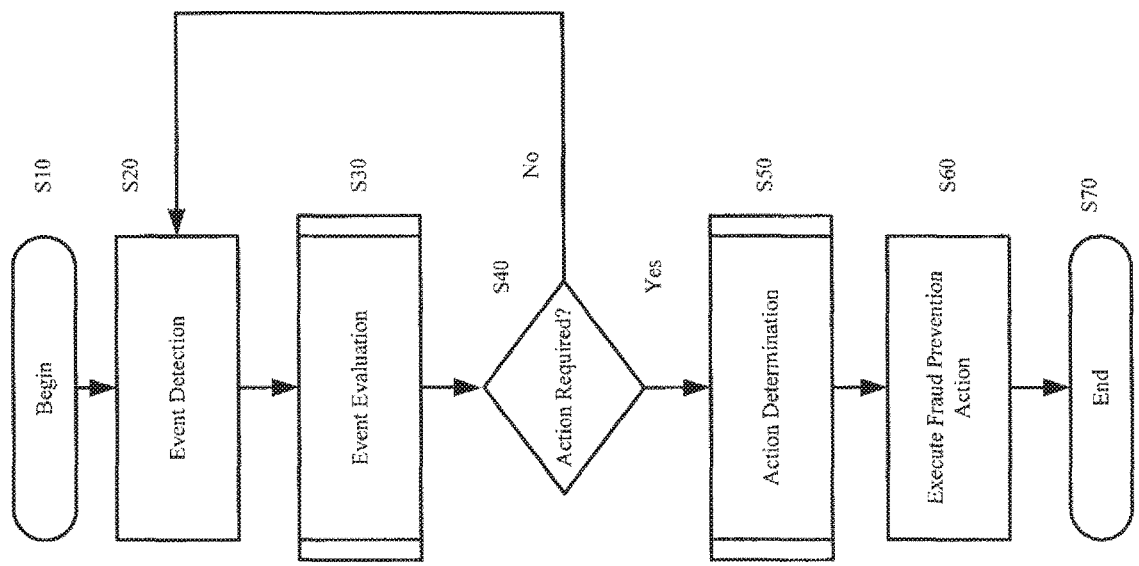
FIG. 10 is a flow chart illustrating a fraud prevention method in accordance with an embodiment of the invention.

FIG. 10 is a flow chart illustrating a fraud prevention method practiced by the fraud monitoring and alert system in accordance with an embodiment of the invention. The method begins in S10 and event detection occurs in S20. Event evaluation is performed by the system in S30. The event evaluation process may include comparing account actions with pre-purchase security controls established by the user as well as any security controls established by the financial institution. Based on this comparison, in S40, the system determines if any action is required. If no action is required in S40, the system returns to S20 to continue event detection.

If action is required in S40, the system determines the appropriate action in S50 and executes the action in S60. The process ends in S70, although the system continues even detection such that the process continues so that fraud prevention occurs in real time. Of course, other methods for performing various functions related to fraud prevention may be practiced with the system of the invention. Various methods are described herein in conjunction with the system.

Figure 11:
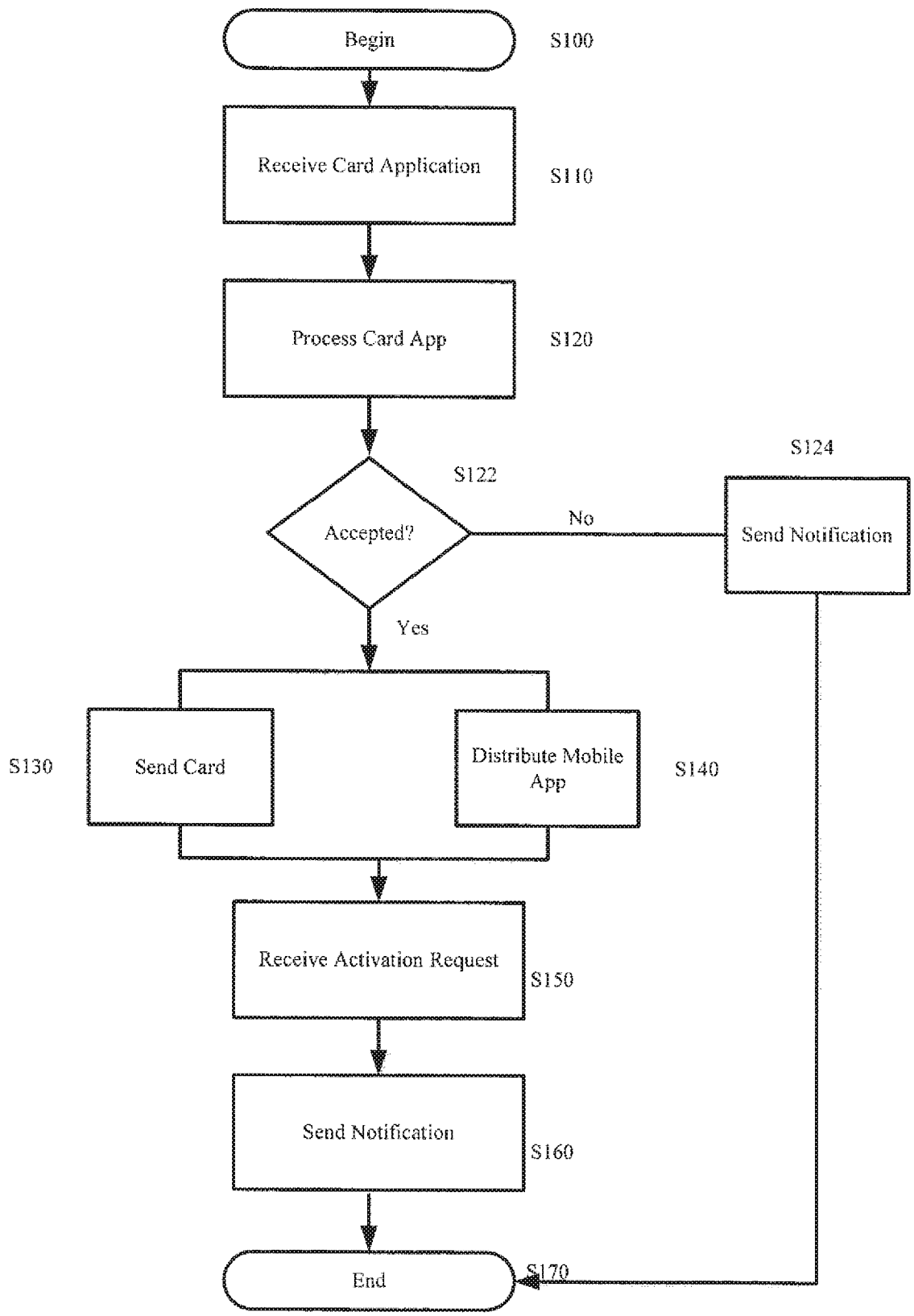
FIG. 11 is a flow chart illustrating a secure mobile application distribution method and card activation method in accordance with an embodiment of the invention.

FIG. 11 is a flow chart illustrating a secure mobile application distribution method and card activation method in accordance with an embodiment of the invention. While the invention as described above provides alerts and notifications regarding card usage, it is also desirable to provide secure distribution and activation to ensure that the card is both distributed securely to the card applicant and activated by an individual who can be securely identified as the cardholder.

The method begins in S100 and the system receives a card application from an applicant in S110. Typically this application is received through entry of data into a website, but may also be received through other channels. To enhance secure activation, various types of information may be requested from the applicant. For example, the application may contain a field asking if the applicant has a smart phone, so that secure mobile distribution of the mobile application can be more easily delivered.

In S120, the system processes the card application by determining whether the individual is a qualified applicant. This determination may be based on credit reports or data maintained or retrieved by the financial institution issuing the card. If the applicant is not accepted in S122, the system may send a notification in S124.

If the applicant is accepted in S122, the system may send the card to the applicant's home or business in S130 and may also distribute the mobile application for tracking expenses in S140. The mobile application may be distributed, for example, by sending a link via text message to the cardholder's smart phone. In preferred embodiment of the invention, the link leads directly to the mobile application. This link enhances the customer experience by allowing the cardholder to proceed directly to the application rather than requiring that the cardholder navigate through various application store interfaces in order to locate and download the application.

In S150, the system receives an activation request from the applicant and in S160, the system sends a notification of the application request to the applicant. Typically, the activation request is received at a voice response unit (VRU) or interactive voice response system (IVR). Other channels, such as internet channels may also be used. Upon receiving the request for activation, the IVR, VRU, or other activation equipment connected with the activation channel, may send an activation notification to the cardholder on the cardholder's smartphone. This ensures that the system notifies the applicant based on the smart phone number provided on the original card application. Thus, if the card has been stolen or misdirected, the applicant will be immediately notified of the activation and can take immediate action if the applicant is not the person attempting to activate the card. The process ends in S170.

While the process described above shows two messages, one with a link to a mobile application and the other with an activation alert, embodiments of the invention may provide the link to the mobile application in the same message as the activation alert. Providing the mobile application link upon activation may alert users to the utility of the mobile application upon activation, which may particularly useful in converting web users to mobile users and in notifying phone users of the enhanced utility their phones may provide if the mobile application is downloaded. Furthermore, for existing cardholders who did provide their smart phone numbers upon activation, the system may provide additional opportunities to enter the smart phone number via a financial institution web site, by calling a VRU or IVR, or by using another channel. Once the smart phone number is provided, the push notification with a link to the mobile application or other information may be supplied.

FIG. 12 is a screen shot illustrating an online application 1200 for use in conjunction with the secure mobile application distribution and card activation method in accordance with an embodiment of the invention. The application 1200 requests standard data that is typically requested on a credit application, but also determines at 1204 whether the applicant owns a smart phone and informs the applicant that a mobile application will be delivered by a link in an SMS message to the applicant's smart phone of the applicant answers "yes". While a cell phone number is typically not a mandatory field in credit applications, in order to successfully transmit an SMS message, the application request a cell phone number at 1202.

FIG. 13 is a screen shot illustrating secure mobile distribution in accordance with an embodiment of the invention. A mobile card acquisition channel 1300 may explain details of the card and provide the card offer. After the applicant submits the card application as described above, the applicant may receive the SMS message 1310. By selecting the provided link, the applicant may be sent directly to the mobile application for download. Through the provision of this message, the applicant avoids navigation through the app store, which can require significant effort. Instead the applicant may proceed directly to the mobile application.

FIG. 14 is a flow chart illustrating a method for secure activation in accordance with an embodiment of the invention. After the applicant is approved for the card, a welcome kit is forwarded to the applicant at 1400, typically by mail. In 1410, the applicant calls the number on the credit card to activate the card. Often, the applicant is calling a VRU or an IVR, but the applicant may also speak with a representative in embodiments of the invention. Upon activation, the system sends a push notification to the smart phone number provided by the cardholder on the original application. An embodiment of the push notification is illustrated at 1420. The push notification references both the activation and the use of the mobile application that is now available to begin expense tracking.

FIG. 15 is a flow chart illustrating a method for secure activation in accordance with another embodiment of the invention. In FIG. 15, an account owner such as an employer requests a card for an employee at 1500. The employee calls to activate the card in a manner similar to that described above with respect to FIG. 14. At 1520, the employer, who is the account owner, receives the push notification indicating that the card has been activated and advising the employer than he can use the mobile application to begin managing employee spending.

The embodiments illustrated both improve the ease of mobile acquisition and enhance the security of mobile users. Also the system effectively utilizes digital distribution and streamlines onboarding procedures. Customers who do not activate online will still be informed of activation via mobile channels. Accordingly, embodiments of the invention enhance security and prevent fraud from the time of activation. Push notifications to account holders upon activation and based and card activity enhance control of the account holder.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A fraud prevention system for preventing fraudulent activity on user accounts, the fraud prevention system interacting with a transaction tracking system for allowing association of transactions with user-defined categories, the fraud prevention system comprising:

a computer memory including at least one database storing
system settings specifying account-related events that require fraud prevention action; and
user-defined settings specifying account-related events that require fraud prevention action, wherein at least one of the user-defined settings pertains to events falling in one of the user-defined categories, and wherein each of the account-related events is assigned one of a low-level security identification, medium-level security identification, and a high-level security identification; and at least one computer processor programmed for providing a plurality of user interfaces for allowing the user to create the user-defined settings, wherein the user-defined settings include:

card controls for allowing activation and deactivation of multiple cards associated with an account;

pre-purchase security settings for enabling the user to notify an account holding institution of events including travel, a large upcoming purchase, and post purchase security settings for enabling the user to dispute a charge, freeze an account, and report a stolen bankcard, wherein the computer processor is further programmed for:

detecting occurrence of the account-related events;

authenticating a system user attempting to perform an account-related action;

determining that an account related event corresponding to the low-level security identification does not require a user authentication while an account related event corresponding to either the medium-level security identification or the high-level security identification requires a user authentication, wherein an account related event corresponding to the low-level security includes storing of line item data of a purchase receipt into the computer memory;

accessing the system settings and the user-defined settings in the computer memory to determine if a fraud prevention action is required in response to the detected account-related event;

activating a fraud prevention user interface for the user when fraud prevention action is required; and receiving user instructions through the fraud prevention user interface and processing the user instructions, wherein the authentication includes detection and verification of a signature gesture, wherein the account related event corresponding to either the medium-level security identification or the high-level security identification requires the detection and verification of the signature gesture, and wherein the storing of line item data of the purchase receipt does not require the detection and verification of the signature.

2. The system of claim 1, wherein the system user is attempting a transaction at a point of sale and the signature gesture is performed with a mobile device implemented as a controller.

3. The system of claim 1, wherein the system user is attempting a transaction at a point of sale and point of sale equipment is implemented to detect the signature gesture.

4. The system of claim 1, wherein the at least one computer processor is further programmed to generate an enriched alert upon detection of specific account-related events, wherein the enriched alert allows the user to view additional details.

5. The system of claim 4, wherein the enriched alert includes notification of a payment due and the additional details provide that the payment is a recurring payment.

6. The system of claim 4, wherein the enriched alert includes a notification that an employee of the user has exceeded a spending limit and the additional details include an interface for increasing the spending limit.

7. The system of claim 4, further comprising formatting the enriched alert for transmission to a particular user mobile device.

8. The system of claim 1, wherein the fraud prevention user interface is one of a pre-purchase user interface providing a real time notification to the user of the account-related event with additional details and a post-purchase user interface providing options for disputing a purchase, viewing transaction details, and reporting stolen bank card.

9. The system of claim 8, wherein the pre-purchase notification includes information that a bank card has been activated.

10. A fraud prevention method for preventing fraudulent activity on user accounts, the method utilizing a fraud prevention system interacting with a transaction tracking system for allowing association of transactions with user-defined categories, the fraud prevention method comprising:

storing, in a computer memory including at least one database, system settings specifying account-related events that require fraud prevention action; and user-defined settings specifying account-related events that require fraud prevention action, wherein at least one of the user-defined settings pertains to events falling in one of the user-defined categories, and wherein each of the account-related events is assigned one of a low-level security identification, medium-level security identification, and a high-level security identification; and utilizing at least one computer processor programmed for providing a plurality of user interfaces for allowing the user to create the user-defined settings, wherein the user-defined settings include:

card controls for allowing activation and deactivation of multiple cards associated with an account;

pre-purchase security settings for enabling the user to notify an account holding institution of events including travel, a large upcoming purchase, and post purchase security settings for enabling the user to dispute a charge, freeze an account, and report a stolen bankcard, wherein the computer processor is further programmed for:

detecting occurrence of the account-related events;

authenticating a system user attempting to perform an account-related action;

determining that an account related event corresponding to the low-level security identification does not require a user authentication while an account related event corresponding to either the medium-level security identification or the high-level security identification requires a user authentication, wherein an account related event corresponding to the low-level security includes storing of line item data of a purchase receipt into the computer memory;

accessing the system settings and the user-defined settings in the computer memory to determine if a fraud prevention action is required in response to the detected account-related event;

activating a fraud prevention user interface for the user when fraud prevention action is required; and receiving user instructions through the fraud prevention user interface and processing the user instructions, wherein the authentication includes detection and verification of a signature gesture, wherein the account related event corresponding to either the medium-level security identification or the high-level security identification requires the detection and verification of the signature gesture, and wherein the storing of line item data of the purchase receipt does not require the detection and verification of the signature.

11. The method of claim 10, wherein the system user is attempting a transaction at a point of sale and the signature gesture is performed with a mobile device implemented as a controller.

12. The method of claim 10, further comprising implementing point of sale equipment to detect the signature gesture.

13. The method of claim 10, wherein the at least one computer processor is further programmed to generate an enriched alert upon detection of specific account-related events, wherein the enriched alert allows the user to view additional details.

14. The method of claim 13, wherein the enriched alert includes notification of a payment due and the additional details provide that the payment is a recurring payment.

15. The method of claim 13, wherein the enriched alert includes a notification that an employee of the user has exceeded a spending limit and the additional details include an interface for increasing the spending limit.

16. The method of claim 13, further comprising formatting the enriched alert for transmission to a particular user mobile device.

17. The method of claim 10, wherein the fraud prevention user interface is one of a pre-purchase user interface providing a real time notification to the user of the account-related event with additional details and a post-purchase user interface providing options for disputing a purchase, viewing transaction details, and reporting stolen bank card.

18. The method of claim 17, wherein the pre-purchase notification includes information that a bank card has been activated.

* * * * *